United States Patent Office 3,493,379
Patented Feb. 3, 1970

3,493,379
SILVER HALIDE EMULSION CONTAINING AMPHOTERIC COATING AID
Gerald Francis Donoghue, Middletown, N.J., assignor to E. I. du Pont de Nemours and Company, Wilmington, Del., a corporation of Delaware
No Drawing. Filed Dec. 22, 1966, Ser. No. 603,768
Int. Cl. G03c 1/72, 1/02
U.S. Cl. 96—114
11 Claims

ABSTRACT OF THE DISCLOSURE

Photographic gelatino-silver halide emulsion layers containing polymeric vinyl compound latices and at least one amphoteric phenolic alkanesulfonic acid salt, which layers are devoid of repellent spots and surface imperfections, and photographic elements, particularly films embodying said layers.

BACKGROUND OF THE INVENTION

Field of the invention

This invention pertains to gelatino-silver halide emulsion layers containing polymeric vinyl compound latices and amphoteric phenolic alkanesulfonic acid salts.

Description of the prior art

It is known to add polymeric vinyl compound latices to a gelatino-silver halide emulsion to improve the physical characteristics of layers coated therefrom. See Potter et al., 2,376,005, May 15, 1945 and Nottorf 3,142,568, July 28, 1964. This is particularly true in the case of lithographic film where dimensional stability, flexibility, impact resistance and anchorage as well as sensitometric characteristics are of paramount importance. Saponin and the other known coating aids have been found to form deficient coatings when the emulsions containing polymeric vinyl compound latices are utilized.

SUMMARY OF THE INVENTION

The light-sensitive silver halide emulsions and emulsion layers of this invention having a binder mixture of gelatin and a polymeric vinyl compound is characterized by containing from 0.3 to 3.0 grams per mole of silver halide of at least one amphoteric phenolic alkane sulfonic acid salt, more particularly an alkyl-substituted, hydroxybenzylaminoalkanesulfonic acid salt, wherein alkyl contains 8–18 carbon atoms and is preferably $C_9H_{19}$—, of the formula:

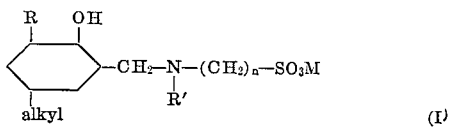

(I)

where R is hydrogen, dimethylaminomethyl, diethylaminomethyl, diisopropylaminomethyl or dihydroxyethylaminomethyl, R' is an alkyl group of 1–5 carbon atoms, n is 1, 2, 3 or 4, and M is lithium, sodium, potassium, or ammonium;

said emulsion containing per mole of silver halide, 40 to 80 grams of gelatin, 10 to 60 grams of a polymerized vinyl compound based on the weight of initial monomer in the polymerization reaction mixture and 0.2 to 2.5 grams of a polyoxyalkylene compound of the formula:

where R is hydrogen, alkyl of 1 to 18 carbon atoms, aryl of 6 to 12 carbon atoms, alkylaryl of 7 to 18 carbon atoms and arylalkyl of 7 to 18 carbon atoms, $R_1$ is hydrogen and alkyl of 1 to 3 carbon atoms and $n$ is a number of 6 to 2500.

DESCRIPTION OF THE PREFERRED EMBODIMENTS

A particularly efficacious amphoteric phenolic alkane sulfonic acid adjuvant having wetting agent properties for admixture with the emulsion is a mixture of 1 part of 2-hydroxy-5-nonylbenzylmethylaminoethane sulfonic acid and 3 parts of its corresponding 3-dimethylaminomethyl-substituted analogue.

The compounds of Formula I and the specific compounds of this type illustrated by the formula are commercially available as amphoteric phenolic alkane sulfonic acid salts. They are sold by Tanatex Chemical Corp., Lyndhurst, N.J. They can be made by known procedures that are briefly described in Chemical Abstracts, vol. 64, p. 11128e (1966). The procedures are described at length in British patent specification 1,012,312 and Swiss Patent 407,156, Aug. 31, 1966. By substituting various homologous compounds for the specific reactants illustrated therein other homologous phenolic compounds can be made.

While many different polymeric vinyl compounds can be used as polymer latices in the silver halide emulsions, a preferred compound is an acrylic acid ester taken from the group consisting of a homopolymer of an acrylic acid ester, a homopolymer of an alpha-hydrocarbon-substituted acrylic acid ester and a copolymer of said acrylic acid esters, said copolymer containing at least 90% by weight of units of said acrylic acid esters.

To be more specific, a preferred class of polymers are the alkyl acrylates and methacrylates, e.g., polymers and copolymers of methyl, ethyl, butyl, ethylhexyl acrylate or methyl and butyl methacrylate. In addition, acrylic acid can be used in the preparation of the copolymers provided no more than 10 mole percent of such acid is used in the polymerization with the other constituents. Other useful classes of vinyl monomers used to prepare the water-insoluble polymeric and copolymeric dispersions are vinyl esters, e.g., the acetate, propionate, etc., vinyl and vinylidene halides, e.g., vinylidene chloride; styrene and substituted styrenes; dienes, e.g., butadiene; acrylonitrile; and alkenes, e.g., ethylene or propylene.

The polymeric vinyl compound, in the form of a hydrosol or colloid dispersion, is preferably dispersed with the aqueous silver halide gelatino-emulsion by means of a dispersing agent, e.g., sodium dodecyl sulfate or a mixture of long chain alkyl sulfates of 8–18 carbon atoms predominating in dodecyl sulfate.

In a preferred embodiment of this invention, an aqueous silver bromochloride lithographic emulsion containing a reduced amount of gelatin, as indicated below, is sensitized and digested in a manner familiar to those skilled in the art. After digestion, but prior to coating, there is added to the emulsion an aqueous acrylic acid ester dispersion containing the above sodium lauryl sulfate as a dispersing agent, at least one of the amphoteric phenolic alkanesulfonic acid salts and a polyoxyethylene compound as described above. The emulsion is then coated to form a layer on a suitable support such as a cellulose ester or linear polyester photographic film base. It is preferred that, for each mole of silver halide, the emulsion contain from 40 to 80 grams of gelatin, from 10 to 60 grams of acrylic acid ester polymer, based on the initial weight of monomer in the polymerization reaction mixture, and from 0.2 to 2.5 grams of the polyoxyethylene compound. The coating is dried, exposed sensitometrically through a neutral density wedge, processed by developing, fixing, etc., and the image densities read on a conventional type of densitometer. The sensitometric behavior of the coating is essentially equivalent to that of the conventional coatings such as those in which gelatin is the sole binder. The coating exhibits considerable improvement over conventional coatings, however, in its improved dimensional stability, halftone dot quality and uniformity of the coated layer which are substantially devoid of clear areas or repellent spots.

The aqueous polymeric dispersions used in this invention are prepared in a conventional manner, starting with a polymerizable liquid vinyl monomer. This monomer is emulsified with water by means of dispersing agent, e.g., sodium lauryl sulfate and subjected to a conventional emulsion polymerization using a free radical initiator, e.g., hydrogen peroxide, an organic peroxide or an azobisnitrile compound as disclosed in U.S. Patent 2,491,959, e.g., alpha,alpha'-azobis-(isobutyronitrile). A suitable detailed procedure is set forth in Procedure A of Nottorf 3,142,568.

The invention will now be illustrated in and by the following examples wherein the parts are by weight.

EXAMPLE I

A lithographic emulsion having a silver halide composition of 30 mole percent AgBr and 70 mole percent AgCl and having 20 grams of gelatin present per mole of silver halide for the steps of precipitation and ripening was freed of unwanted, soluble by-product salts by the coagulation and washing procedure taught in assignee's Moede U.S. Patent 2,772,165 wherein the silver halide and most of the gelatin were coagulated by an acid-soluble partial acetal of polyvinyl alcohol and o-sulfobenzaldehyde at pH 5.5 and consisting of 5 grams of sulfonate sulfur per 100 grams of polymer. Sulfuric acid of 3 N strength was used to lower the pH to 2.5 and the precipitate (and insoluble complex of the gelatin and the o-sulfobenzaldehyde polyvinyl acetal containing entrapped silver halide and gelatin) settled out as discrete particles, and the supernatant liquid containing the said soluble salts was decanted. The precipitate was thoroughly washed with water and then redispersed in water by raising the pH to about 5.60 with 1 molar sodium hydroxide and adding 47 grams of bulking gelatin. The redispersed emulsion was treated with a conventional sensitizer and an optical sensitizer to confer sensitivity to green light, was digested at 54° C. to increase sensitivity, was cooled to a holding temperature of about 38° C. and treated with conventional post sensitization additives and stabilizers such as additional halide, antifogger, etc., as is common in the art. There was also added approximately 14 ml. of a 10% aqueous solution of a polyoxyethylene compound which has the formula:

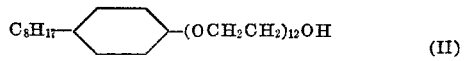

(II)

and 55 grams of an aqueous polyethyl acrylate dispersion prepared as described above. The emulsion was then divided into three equal portions and there was added to each of these portions, per mole of silver, 333 mg., 666 mg., and 1332 mg. of the following mixture of compounds:

1 part

OH
⟨⟩—CH₂—N—CH₂CH₂SO₃Na
         |
         CH₃
C₉H₁₉
(III)

3 parts

N(CH₃)₂
|
CH₂  OH
|     |
⟨⟩—CH₂—N—CH₂CH₂SO₃Na
         |
         CH₃
C₉H₁₉
(IV)

The pH's of the emulsions were adjusted to about 5.8 and they were coated on polyethylene terephthalate photographic film base coated on both sides with a vinylidene chloride/methyl acrylate/itaconic acid copolymer, as described in Example IV of Alles, U.S. Patent 2,779,684, on which had been coated on both sides a thin anchoring substratum layer of gelatin (0.5 mg./dm.²) over which on the side opposite the emulsion layer there had been coated an antihalation, dye-containing layer of gelatin containing 25% by weight of polyethyl acrylate dispersed as described above. The coating provided a silver halide coating weight equivalent to about 63 mg. of silver halide per square decimeter when dry. Samples of these coatings were given a 20-second, intensity-scale sensitometric step wedge exposure to a white light tungsten lamp. The exposure in each successive step increased by the factor of the fourth-root-of-two. The exposed samples were developed for 2¼ minutes in the following lithographic developer to determine their sensitometric characteristics:

| | Grams |
|---|---|
| Hydroquinone | 22.5 |
| Sodium sulfite (anhyd.) | 30.0 |
| Sodium bisulfite | 2.2 |
| Boric acid | 7.5 |
| Potassium bromide | 1.6 |
| Paraformaldehyde | 7.5 |

Water to make 1.0 liter.

Other samples of these coatings were exposed to a ruled glass halftone screen in an apparatus simulating the conditions used in the preparation of halftone copies, and similarly developed 2¼ and 2¾ minutes, respectively, to determine their ability to yield good halftone dots. After development, the coatings were treated in a conventional acid hardening and fixing bath containing 153 grams of anhydrous sodium thiosulfate per liter, washed, in tap water, and dried in a conventional manner. The sensitometric characteristics of these coatings, and tabulated below, with a commercial lithographic film serving as a control.

| Quantity of phenolic alkane sulfonic acid salt per mole silver halide | Repellency characteristics | Relative speed | Gradient | Fog | Halftone dot quality |
|---|---|---|---|---|---|
| 0 (Control) | Poor | 18.3 | 15.0 | .01 | Good. |
| 333 mg | Good | 18.0 | 15.0 | .02 | Do. |
| 666 mg | do | 18.7 | 16.4 | .02 | Do. |
| 1,332 mg | do | 17.1 | 14.8 | .02 | Do. |

It was observed that 666 mg. per mole of silver halide of the amphoteric wetting agent mixture appeared to be the optimum quantity insofar as the sensitometric characteristics are concerned, although larger or smaller quantities could be used to good effect.

EXAMPLE II

Example I was repeated except in place of the mixture of phenolic ethane sulfonic acid sodium salt amphoteric wetting agent used in that example there was used 1000 mg. and 1500 mg. per mole of silver halide of the phenolic ethane sulfonic acid salt having the following formula: 1 part of the compound of Formula III of Example I and 3 parts of the compound of Formula III but containing a diisopropylaminomethyl radical attached to the benzene ring adjacent the —OH group.

The emulsion was coated, exposed, processed and tested as described in Example I. The coatings were observed to be without repellency spots as compared to a commercial film serving as a control. Sensitometric properties are shown in the following table:

| Quantity of phenolic alkane sulfonic acid salt per mole silver halide | Relative speed | Sensitometric properties | |
|---|---|---|---|
| | | Gradient | Fog |
| 0 (Control) | 16.0 | 15.6 | .04 |
| 1,000 mg | 16.3 | 16.1 | .04 |
| 1,500 mg | 16.3 | 16.3 | .04 |

EXAMPLE III 1 part of the compound of Formula III of Example I and 3 parts of the corresponding compound having a dihydroxy-ethylaminomethyl group attached to the benzene ring adjacent the —OH group were used to prepare an emulsion like that in Example I.

The emulsion was coated to give good continuous layers free of repellent spots. The coated emulsions were exposed, processed and tested as described in Example I to give the following sensitometric results.

| Quantity of phenolic alkane sulfonic acid salt per mole silver halide | Relative speed | Sensitometric properties | |
|---|---|---|---|
| | | Gradient | Fog |
| 0 (Control) | 16.2 | 16.8 | .04 |
| 1,000 mg | 16.4 | 16.7 | .04 |
| 1,500 mg | 16.8 | 15.7 | .04 |

A number of polyoxyethylene derivatives, in addition to the one used in the examples are useful in this invention. These include the derivatives disclosed in Stanton, U.S. Patent 2,531,932, of the formula: R—$(CH_2CH_2O)_n$—$R_1$ where R is hydrogen or an aliphatic carboxylic acyl radical of 1 to 18 carbons and $R_1$ is hydrogen or an aliphatic carboxylic acid radical of 1 to 18 carbon atoms and $n$ is 9 to 200 or more; the polyoxyalkylene ethers of ring-dehydration products of hexitols as disclosed in Blake et al., U.S. Patent 2,400,532, and the oxyethylene compounds of the formula R—$(OCH_2CH_2)_n$—$OR_1$ where R is taken from the group consisting of hydrogen alkyl and alkyl —CO— groups of 1 to 18 carbon atoms, $R_1$ is taken from the group consisting of alkyl and alkyl —CO— groups of 1 to 18 carbon atoms and $n$ is 6 to 18. It is understood that the value for $n$ in the polyoxyethylene compounds, i.e., 6 to 2500, is an average value because the compounds are mixtures of various weight polymers.

Although the preferred emulsions of this invention contain silver halide grains of bromochloride containing at least 50 mole percent chloride, some of the advantages, e.g., avoidance of repellency spots, etc., may be realized, where desirable, in aqueous gelatin emulsions containing other types of silver halide grains, e.g., bromide, iodobromide, iodochloride, etc., and mixtures thereof, such as are used in cine negative, radiographic, microfilm, recording and astronomical films.

The aqueous gelatin emulsions useful in the invention may be prepared by various procedures, e.g., by standard chilling, shredding, washing, sensitization and digestion operations or by precipitating with a water-soluble, acid-soluble, organic polymer of high molecular weight containing a plurality of recurring oxy groups and recurring acid or acid salt groups and an acid to lower the hydrogen ion concentration to a value below the isoelectric point of the gelatin and recovering the precipitate. A large number of such polymeric compounds are available. Among them are the polyvinyl acetals containing sulfonic acid groups made from o-sulfobenzaldehyde, alpha- and beta-sulfopropionaldehyde, and polyvinyl alcohol or partially hydrolyzed polyvinyl acetate, etc. Polyvinyl acetals of these types and their preparation are described in U.S. Patents 2,462,527; 2,609,290 and German Patent 643,650. They should contain sufficient acid groups to be acid-soluble.

The present invention is not limited to the use of a particular film base support as the emulsion may be coated on various films, paper and plates composed of glass, metal, e.g., aluminum, various waterproof papers, cellulose derivatives, and superpolymers listed in U.S. Patent 3,142,568.

Of course, various sublayers may be present to anchor the emulsion layer to the base as is common in photographic film manufacture. A suitable example is the vinylidene chloride coating supports of Alles et al. U.S. Patent 2,627,088. Also, other auxiliary layers may be employed, such as abrasion layers and antihalation backing layers or undercoat layers. Suitable antihalation layers are disclosed in U.S. Patents 1,923,485; 2,085,736; 2,274,782 and 2,282,890. A preferred backing layer is prepared by mixing gelatin and an aqueous dispersion of a polymerized vinyl compound of the types disclosed above. For each 10 to 60 grams of polymer there is preferably 40 to 80 grams of gelatin in the backing layer. The ratio of polymer to gelatin can range from 10:80 to 60:40.

The emulsions may be modified by the addition of general emulsion sensitizers listed in U.S. Patent 3,142,568.

The novel emulsions of this invention are useful in the manufacture of lithographic films having improved physical properties and improved halftone dot quality and sensitometric characteristics.

An advantage of the lithographic films bearing the improved photographic emulsions is that the layers are essentially free of repellent spots and other surface imperfections. The films also have good dimensional stability and sensitometric characteristics. Still other advantages will be apparent to those skilled in the art.

The embodiments of the invention in which an exclusive property or privilege is claimed are defined as follows:

1. A light-sensitive silver halide emulsion having a binder for the silver halide grains that is a mixture of gelatin and a dispension of a water-insoluble polymeric vinyl compound, the emulsion containing from about 0.3 to about 3.0 grams per mole of silver halide of at least one amphoteric alkyl-substituted hydroxybenzylaminoalkanesulfonic acid salt wherein the alkyl radical contains 8–18 carbon atoms.

2. An emulsion according to claim 1 wherein the binder is a mixture of 40–80 parts of gelatin and 10 to 60 parts of the polymeric vinyl compound.

3. An emulsion according to claim 2 wherein said polymeric vinyl compound is a polymeric acrylic acid ester compound.

4. An emulsion according to claim 2 wherein said amphoteric salt is a lithium, sodium, potassium or ammonium salt of 2-hydroxy-5-nonylbenzylmethylaminoethane sulfonic acid.

5. An emulsion according to claim 2 wherein a mixture of the lithium, sodium, potassium, and ammonium salts of 2-hydroxy-5-nonylbenzylmethylaminoethane sulfonic acid and its 3-dimethylaminomethyl substituted analogue is present.

6. An emulsion according to claim 5 wherein the two salts are present in a 1–3 ratio, by weight.

7. A light-sensitive silver halide emulsion having a binder for the silver halide grains that is a mixture of gelatin and a dispersion of a water-insoluble polymeric vinyl compound, the emulsion containing from about 0.3 to about 3.0 grams per mole of silver halide of at least one amphoteric alkyl-substituted hydroxybenzylaminoalkanesulfonic acid salt:

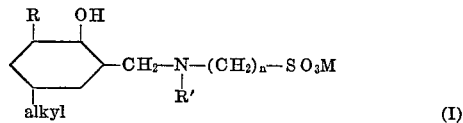

where R is hydrogen, dimethylaminoethyl, diethylaminomethyl, diisopropylaminomethyl or dihydroxyethylaminomethyl, R' is an alkyl group of 1–5 carbon atoms,
n is 1, 2, 3 or 4, and
M is lithium, sodium, potassium, or ammonium.

8. An emulsion according to claim 7 wherein the binder is a mixture of 40–80 parts of gelatin and 10 to 60 parts of the polymeric vinyl compound.

9. An emulsion according to claim 7 wherein said polymeric vinyl compound is a polymeric acrylic acid ester compound.

10. An emulsion according to claim 7 wherein said amphoteric salt is a lithium, sodium, potassium or ammonium salt of 2-hydroxy-5-nonylbenzylmethylaminoethane sulfonic acid.

11. An emulsion according to claim 7 wherein a mixture of a lithium, sodium, potassium, or ammonium salt of 2-hydroxy-5-nonylbenzylmethylaminoethane sulfonic acid and its 3-dimethylaminomethyl substituted analogue is present.

References Cited

UNITED STATES PATENTS 3,113,026  12/1963  Sprung _____ 96—114

FOREIGN PATENTS 1,012,312  12/1955  Great Britain.

OTHER REFERENCES

Chemical Abstracts, vol. 64, 1966.
Photographic Emulsion Techniques, by T. T. Baker, 2nd edition, 1948, p. 258.

RONALD H. SMITH, Acting Primary Examiner

U.S. Cl. X.R.

96—94